United States Patent [19]

Timmins

[11] 3,864,914
[45] Feb. 11, 1975

[54] CONTROL LINKAGES

[75] Inventor: Sidney Timmins, Aldershot, England

[73] Assignee: Air-Log Limited, Hampshire, England

[22] Filed: July 24, 1973

[21] Appl. No.: 382,070

[52] U.S. Cl.................. 60/434, 74/480 R, 74/481, 417/15, 417/217
[51] Int. Cl........................ G05g 13/00, F04b 49/00
[58] Field of Search...... 74/480 R, 480 B, 481, 482, 74/469; 60/434; 417/15, 217

[56] References Cited
UNITED STATES PATENTS

| | | | |
|---|---|---|---|
| 1,594,331 | 7/1926 | Henke | 74/482 |
| 1,736,132 | 11/1929 | Rippingille | 74/481 X |
| 2,867,131 | 1/1959 | Schroeder | 74/480 B X |
| 2,987,935 | 6/1961 | Amelio | 74/480 |
| 3,316,773 | 5/1967 | Findlay | 74/481 |
| 3,511,105 | 5/1970 | Matter | 74/481 |

Primary Examiner—Allan D. Herrmann
Attorney, Agent, or Firm—Edward F. Connors

[57] ABSTRACT

A control linkage comprises a control lever mounted for pivotal movement and means to pivot the control lever. A slide member is constrained to slide along the control lever and means are provided to control the movement of the slide member along the control lever. A pivotally mounted output lever is connected to the slide member by a link pivotally connected to the output member. The control linkage is especially designed for controlling a hydraulic power system on a vehicle, for example a vehicle for loading aircraft.

9 Claims, 4 Drawing Figures

PATENTED FEB 1 1 1975 3,864,914

CONTROL LINKAGES

BACKGROUND OF THE INVENTION

The invention relates to linkages, and particularly but not exclusively to linkages for controlling hydraulic power systems.

SUMMARY

According to the invention a control linkage comprises a control lever mounted for pivotal movement, means to pivot the control lever, a slide member constrained to slide along the control lever, means to control the movement of the slide member along the control lever, and a pivotally mounted output lever connected to the slide member by a link which link is pivotally connected to the output lever.

Preferably the slide member is constrained to slide along an arcuate path and the distance from the slide member to the pivotal connection between the output lever and the link being equal to the radius of curvature of the said arcuate path.

It is also preferred that a first output link is connected to a fixed point on the control lever such that the distance moved by at least part of the first output links for a given pivotal movement of the control lever is constant, and said first-mentioned link comprises a second output link connected to the slide member so that the distance moved by the second output link for a given pivotal movement of the control lever can be varied by moving the slide member along the control lever.

The said first output link may comprise a second lever rigidly mounted on the control lever.

Preferably the control lever has an elongate slot therein and the slide member is arranged in the slot and slideable therealong.

The pivot point for the control lever may be arranged intermediate the ends of the slot.

The means to pivot the control lever may comprise a push and pull member connected to the control lever.

Alternatively the means to pivot the control lever may comprise a push or pull member, means being provided to bias the control lever into a datum position from which it can be moved against the bias by actuating the push or pull member.

The linkage according to the second aspect of the invention may be used to control a hydraulic power system comprising a power unit (e.g. an engine), a variable displacement hydraulic pump arranged to be driven by the unit and a hydraulic motor arranged to be driven by the pump, the first output link being connected to the speed control of the power unit and the second output link being arranged to control the displacement of the pump.

With such an arrangement the speed of the power unit can be directly controlled by the pivotal movement of the control lever, and the speed of the pump which will result from any chosen power unit speed may be varied by altering the position of the slide member relative to the control lever, thus altering the degree of travel of the second output link which results from any chosen pivotal movement of the first-mentioned lever.

The invention includes a hydraulic power system in combination with a linkage according to the second aspect of the invention.

The power unit may comprise a diesel engine.

The invention also includes a vehicle powered by such a system.

The vehicle may for example comprise an earth moving vehicle or a transport and/or loading vehicle (for example for loading aircraft).

The hydraulic motor may comprise a variable displacement motor and additional means may be provided to vary the displacement of the motor.

DESCRIPTION OF THE PREFERRED EMBODIMENT

Figure 1:
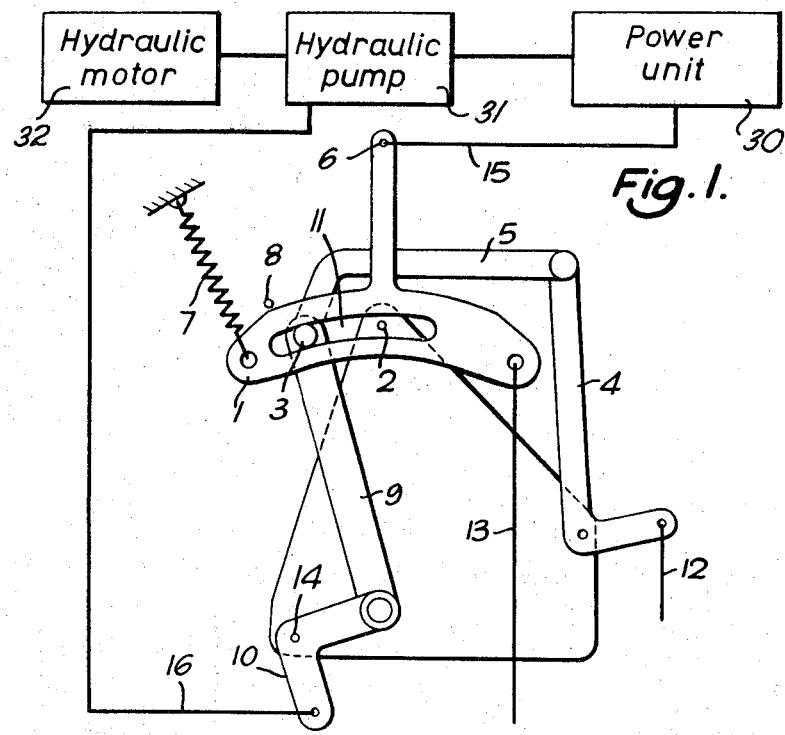
FIG. 1 is a diagrammatic plan view, by way of example of the linkage showing the control lever in the datum position.

Referring first to FIG. 1 the linkage forming the subject of this example comprises an arcuate control lever 1 mounted for pivotal movement about a point 2. The lever is biased into the position shown by the tension spring 7 positioned between a fixed support and one end of the lever. The position is defined by a stop 8 which abuts the upper surface of the lever. The lever 1 has an arcuate slot 11.

A cross-head or slide member 3 is arranged in the slot 11 to slide therealong, movement of the member 3 being controlled by an L-shaped lever 4 pivotally connected to an L-shaped link 5. The end of the short arm of link 5 is pivotally connected to the member 3 and the angle of member 4 is pivotally connected to a fixed mounting. A push pull rod 12 is attached to the end of the short arm of lever 4 and pushing or pulling on this rod will move member 3 along slot 11 either to the left or right as viewed in the Figures.

A first output link is provided comprising a lever 6 integral with the lever 1.

A push rod 13 is connected to the right hand end of lever 1 to control the pivotal movement thereof.

A second output link comprising a strut 9 is connected at one end to the slide member 3. The other end of the strut 9 is pivotally connected to one arm of a bellcrank lever 10 which itself is pivotally mounted at a fixed point 14. The length of the strut 9 is equal to the radius of the arcuate slot 11.

It will be seen that any given amount of movement of push rod 13 will cause a fixed pivotal movement of lever 1 and of lever 6. The degree of movement of slide member 3 when lever 1 is pivoted will however depend on the position of the slide member 3 in the slot 11. If the slide member is positioned at point 2 it will not move at all when lever 1 is pivoted. As the slide member 3 is moved along the slot away from the point 2 the amount of movement due to pivotal movement of lever 1 will increase.

The linkage shown is used to control the hydraulic power system of a vehicle. The system comprises a diesel engine 30 arranged to drive a hydraulic pump 31 which in turn is arranged to drive a hydraulic motor 32. Lever 6 is connected by a cable 15 to the throttle control of the engine. The pump is a variable displacement pump, the variable displacement being provided by a variable angle swash plate, and the lower arm of the bellcrank lever 10 is connected by a push-pull rod 16 to the control governing the variable angle of the swash plate. The push rod 13 is connected to a throttle pedal of the vehicle and the push pull rod 12 is connected to a speed selector for operation by the driver of the vehicle.

The arrangement is such that any given movement of the throttle pedal of the vehicle will always produce the same engine speed. However the road speed of the vehicle for any given movement of the throttle pedal may be adjusted by operating the speed control.

The bellcrank lever 10 is arranged so that when in the position shown in FIG. 1 the angle of the swash plate of the pump is such that there is no output from the pump. Furthermore clockwise rotation of the bellcrank lever will angle the swash plate such that when the engine drives the pump the hydraulic motor is driven in the forward direction. Any anti-clockwise motion of the bellcrank lever from the position shown in FIG. 1 will angle the swash plate such that the hydraulic motor will move in the reverse direction when the pump is driven by the engine.

Figure 2:
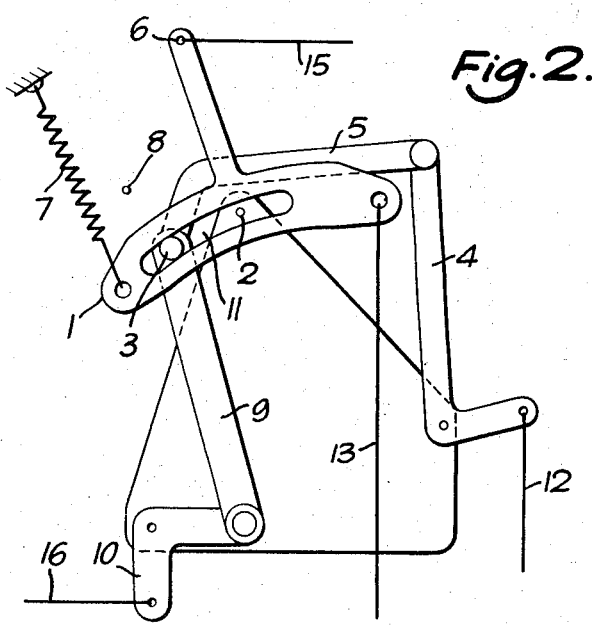
FIG. 2 is a diagrammatic plan view of the linkage showing the control lever in a different position.

When the vehicle is at rest the member 3 will normally be maintained at the pivot point 2 to provide a neutral position. Any movement of the vehicle throttle when the member is in this position will actuate the engine speed control but will not cause the hydraulic motor to be driven. When the driver wishes to move the vehicle he first adjusts the speed selector which acts on push pull rod 12 and positions member 3 to provide a forward speed or reverse speed for the hydraulic motor as desired. In FIG. 1 the member 3 is shown as positioned to give approximately 75% of full forward speed. The driver then operates the throttle of the vehicle which pivots lever 1 as shown in FIG. 2. The pivoting of lever 1 progressively opens the engine throttle. It also progressively increases the angle of the swash plate in the pump to provide a progressively increasing flow to the hydraulic motor in the forward direction. It is an advantage of the linkage according to the invention that the angle of the swash plate in the pump increases with the speed of the engine so that when the engine is running at very low speeds (and therefore producing low torque) the angle of the swash plate and therefore the displacement of the pump is also kept low.

Figure 3:
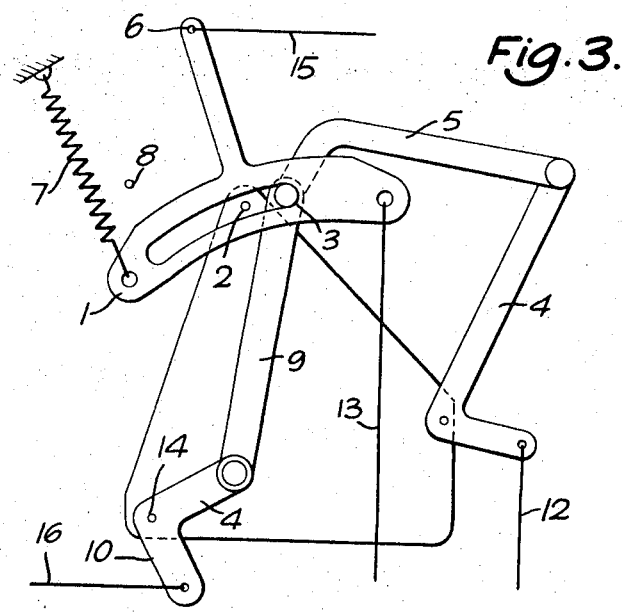
FIG. 3 is a further diagrammatic plan view showing the control lever in the same position as in FIG. 2 but with the slide member in a different position.

FIG. 3 shows lever 1 in the same position as that shown in FIG. 2 but with the member 3 arranged to give full reverse speed.

Figure 4:
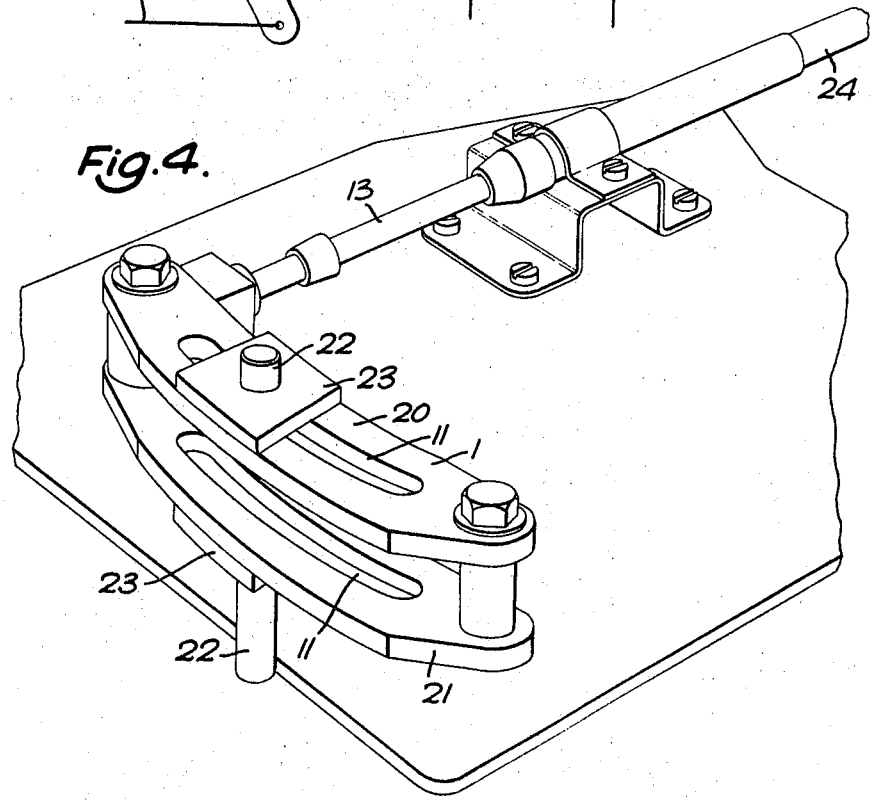
FIG. 4 is a perspective view of the lever and means for pivoting the lever.

FIGS. 1 to 3 are diagrammatic but FIG. 4 is a perspective view showing one example of a practical form of the lever 1 and push rod 13. Other parts of the linkage are omitted for clarity.

The lever 1 comprises two parts 20, 21 bolted together in spaced apart relationship. Each part has an arcuate slot 11 therein. In order for the lever 1 to be pivotally mounted intermediate the ends of slot 11 two stub axles 22 are provided on two plates 23 welded to the parts 20, 21. The push rod 13 is housed in a sheath 24 for remote operation in a known manner.

The linkage according to the invention provides a simple control system for the vehicle, the driver being only required to operate a speed selector and a throttle.

The speed selector may be a control lever arranged in a gate in a conventional manner, the gate having a number of positions for the control lever corresponding to desired speeds.

The throttle control is preferably a foot pedal but a hand throttle may be provided in addition or as an alternative.

The hydraulic pump may be a variable displacement pump and the speed selector may be connected to the motor so that when the speed selector is moved in a direction to increase the vehicle speed the displacement of the motor is reduced.

The fact that the engine throttle may be opened without actuating the hydraulic motor by operating a foot or hand throttle of the vehicle while the member 3 is positioned at the pivot point 2 means that other hydraulic systems arranged on the vehicle may be driven by the engine while the vehicle is stationary.

The invention is not restricted to the features of the foregoing example. For instance lever 6 need not be integral with lever 1.

We claim:

1. A control linkage comprising a control lever mounted for pivotal movement, means to pivot the control lever, a slide member constrained to slide along the control lever, means to control the movement of the slide member along the control lever, and a pivotally mounted output lever connected to the slide member by a link which link is pivotally connected to the output lever the slide member being constrained to slide along an arcuate path and the distance from the slide member to the pivotal connection between the output lever and the link being equal to the radius of curvature of the said arcuate path.

2. A control linkage as claimed in claim 1 in which a first output link is connected to a fixed point on the control lever such that the distance moved by at least part of the first output link for a given pivotal movement of the control lever is constant, and said first-mentioned link comprises a second output link connected to the slide member so that the distance moved by the second output link for a given pivotal movement of the control lever can be varied by moving the slide member along the control lever.

3. A control linkage as claimed in claim 2 in which the first output link comprises a second lever rigidly mounted on the control lever.

4. A control linkage as claimed in claim 2 in which the control lever has an elongate slot therein and the slide member is arranged in the slot and slideable therealong.

5. A control linkage as claimed in claim 4 in which the pivot point for the control lever is arranged intermediate the ends of the slot.

6. A control linkage as claimed in claim 2 in which the means to pivot the control lever comprises a push and pull member connected to the control lever.

7. A control linkage as claimed in claim 2 in which the means to pivot the control lever comprises a push or pull member, means being provided to bias the control lever into a datum position from which it can be moved against the bias by actuating the push or pull member.

8. A hydraulic power system controlled by a linkage as claimed in claim 2, the system comprising a power unit, a variable displacement hydraulic pump arranged to be driven by the unit and a hydraulic motor arranged to be driven by the pump, the first output link being connected to the speed control of the power unit and the second output link being arranged to control the displacement of the pump.

9. A hydraulic power system as claimed in claim 8 in which the power unit comprises a diesel engine.

* * * * *